(12) United States Patent
Yang et al.

(10) Patent No.: US 11,097,311 B2
(45) Date of Patent: Aug. 24, 2021

(54) HYBRID LAYERED STRUCTURE, METHOD AND SYSTEM INCLUDING SAME

(71) Applicant: BMIC LLC, Dallas, TX (US)

(72) Inventors: Li-Ying Yang, Whippany, NJ (US); Yan Zheng, Dallas, TX (US); Brian Duffy, Dallas, TX (US); Yixi Xiao, Dallas, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/150,812

(22) Filed: Jan. 15, 2021

(65) Prior Publication Data

US 2021/0220870 A1    Jul. 22, 2021

Related U.S. Application Data

(60) Provisional application No. 62/962,727, filed on Jan. 17, 2020.

(51) Int. Cl.
*B05D 7/00* (2006.01)
*B32B 27/08* (2006.01)
*B32B 27/16* (2006.01)

(52) U.S. Cl.
CPC .............. *B05D 7/586* (2013.01); *B32B 27/08* (2013.01); *B32B 27/16* (2013.01); *B05D 2451/00* (2013.01); *B32B 2250/04* (2013.01); *B32B 2250/40* (2013.01); *B32B 2255/10* (2013.01); *B32B 2307/304* (2013.01); *B32B 2307/7246* (2013.01); *B32B 2419/06* (2013.01)

(58) Field of Classification Search
CPC .... B05D 7/586; B05D 2451/00; B32B 27/08; B32B 27/16; B32B 2307/7246; B32B 2250/40; B32B 2250/04; B32B 2419/06; B32B 2255/10; B32B 2307/304
See application file for complete search history.

(56) References Cited

U.S. PATENT DOCUMENTS

3,328,232 A    6/1967  Dunn et al.
4,937,991 A *  7/1990  Orth .................... E04D 13/1407
                                                         138/157

(Continued)

FOREIGN PATENT DOCUMENTS

CN    106574145 A  *  4/2017  ........... C09D 171/02
WO    99/43906 A1    9/1999

OTHER PUBLICATIONS

"What is Roof Flashing, Why is it Important, and How Can I Install It?", IKO Industries, Inc. <<https://www.iko.com/na/learning-center/roofing-101/>>.

(Continued)

*Primary Examiner* — Nathan L Van Sell
(74) *Attorney, Agent, or Firm* — Greenberg Traurig, LLP

(57) ABSTRACT

Some embodiments of the present disclosure relate to methods and roofing systems including a hybrid layered structure. In some embodiments, the hybrid layered layer structure, method, and system are used for waterproofing at least one steep slope roof substrate. In some embodiments, the at least one steep slope roof substrate at least one protruding member protruding from the at least one steep slope roof substrate. In some embodiments, the hybrid layered structure comprises a first coating layer, a roofing membrane, and a second coating layer.

11 Claims, 3 Drawing Sheets

(56) References Cited

U.S. PATENT DOCUMENTS

| | | | |
|---|---|---|---|
| 5,493,827 A * | 2/1996 | Georgeau | E04D 13/1407 |
| | | | 52/219 |
| 6,185,885 B1 | 2/2001 | Thaler | |
| 7,368,155 B2 | 5/2008 | Larson et al. | |
| 7,887,900 B2 | 2/2011 | DiPede | |
| 8,833,037 B2 | 9/2014 | French et al. | |
| 10,988,933 B2 | 4/2021 | Reynolds et al. | |
| 2006/0046084 A1 | 3/2006 | Yang et al. | |
| 2009/0178347 A1 | 7/2009 | Hoffman | |
| 2010/0109318 A1* | 5/2010 | Mulligan | E04D 13/0409 |
| | | | 285/42 |
| 2014/0134373 A1* | 5/2014 | Kalwara | B32B 27/06 |
| | | | 428/41.8 |
| 2019/0330854 A1 | 10/2019 | Reynolds et al. | |

OTHER PUBLICATIONS

"What is Flashing", Greenawalt Roofing Company, Apr. 3, 2018 <<https://www.greenawaltroofing.com/blog/2018/3/1/what-is-flashing>>.

* cited by examiner

HYBRID LAYERED STRUCTURE, METHOD AND SYSTEM INCLUDING SAME

RELATED APPLICATIONS

The present application claims priority to U.S. Provisional Application No. 62/962,727 filed, Jan. 17, 2020, which is incorporated by reference herein in its entirety for all purposes.

FIELD

The field of the present disclosure relates to a hybrid layered structure and a method and system including the same. In some embodiments, the hybrid layered structure, method and system can be utilized for waterproofing a residential roof.

BACKGROUND

Over 90% of residential roofs in the United States are covered with shingles. For many of these residential roofs, an underlayment may be applied to the roof (e.g., on a roof deck) prior to shingle installation. In addition, flashing (including but not limited to multi-step flashing) around chimneys, dormers, valleys, skylights, and the like may be needed. In addition, labor shortages can pose an issue in the roofing industry. Roofing methods and systems with faster installation times are therefore needed.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments of the present disclosure relate to a method comprising obtaining a roofing membrane.

In some embodiments, the method comprises obtaining a liquid applied roofing formulation. In some embodiments, the liquid applied roofing formulation comprises at least one resin. In some embodiments, the at least one resin is chosen from polysiloxane, polyurea, polyurethane, silane modified ether, silane modified ester, silane modified polyurethane, silane modified polyurea, epoxy resin, acrylic resin, polyacrylic resin, any precursor thereof, or any combination thereof. In some embodiments, the at least one resin is present in an amount ranging from 20% to 100% based on a total weight of the liquid applied roofing formulation. In some embodiments, the liquid applied roofing formulation has a viscosity ranging from 100 cP to 10 million cP at 25° C. measured using a Brookfield viscometer at 20 rpm.

In some embodiments, the method comprises applying the liquid applied roofing formulation to at least one flashing area of at least one steep slope roof substrate so as to form a first coating layer on the at least one flashing area.

In some embodiments, the at least one steep slope roof substrate comprises at least one protruding member, where the protruding member protrudes from the at least one steep slope roof substrate.

In some embodiments, the at least one steep slope roof substrate roof comprises the at least one first flashing area. In some embodiments, the at least one first flashing area comprises an interface between the at least one steep slope roof substrate and the at least one protruding member.

In some embodiments, the method comprises covering the at least one steep slope roof substrate with the roofing membrane.

In some embodiments, the method comprises reapplying the liquid applied roofing formulation to a second flashing area of the roof so as to form a second coating layer on the at least one second flashing area. In some embodiments, the at least one second flashing area comprises an interface between the roofing membrane and the at least one protruding member.

In some embodiments, the first coating layer and the roofing membrane, and the second coating layer define a hybrid layered structure. In some embodiments, the first coating layer, the roofing membrane, and the second coating layer define the hybrid layered structure.

Some embodiments, of the present disclosure relate to a roofing system.

In some embodiments, the roofing system comprises at least one steep slope roof substrate. In some embodiments, the at least one steep slope roof substrate comprises at least one protruding member. In some embodiments, the at least one protruding member protrudes from the at least one steep slope roof substrate. In some embodiments, the at least one steep slope roof substrate comprises at least one flashing area. In some embodiments, the at least one flashing area comprises an interface between the at least one steep slope roof substrate and the at least one protruding member.

In some embodiments, the roofing system comprises a plurality of flashing areas, such as but not limited to, a second flashing area. In some embodiments, the second flashing area comprises a second interface between a roofing membrane and the at least one protruding member.

In some embodiments, the roofing system comprises a hybrid layered structure.

In some embodiments, the hybrid layered structure comprises a first coating layer. In some embodiments, the first coating layer is disposed over the at least one flashing area or disposed over at least one of the plurality of flashing areas, when more than one is present. In some embodiments, the first coating layer comprises at least one first resin. In some embodiments, the at least one first resin is chosen from polysiloxane, polyurea, polyurethane, silane modified ether, silane modified ester, silane modified polyurethane, silane modified polyurea, epoxy resin, acrylic resin, polyacrylic resin, any precursor thereof, or any combination thereof. In some embodiments, the at least one first resin is present in an amount ranging from 20% to 100% based on a total weight of the first coating layer.

In some embodiments, the hybrid layered structure comprises the roofing membrane. In some embodiments, the roofing membrane is disposed over the first coating layer and the at least one steep slope roof substrate.

In some embodiments, the hybrid layered structure comprises a second coating layer. In some embodiments, the second coating layer is disposed over the at least one second flashing area. In some embodiments, the second coating layer comprises at least one second resin. In some embodiments, the at least one second resin is chosen from polysiloxane, polyurea, polyurethane, silane modified ether, silane modified ester, silane modified polyurethane, silane modified polyurea, epoxy resin, acrylic resin, polyacrylic resin, any precursor thereof, or any combination thereof. In some embodiments, the at least one second resin is present in an amount ranging from 20% to 100% based on a total weight of the second coating layer.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

Figure 3A:
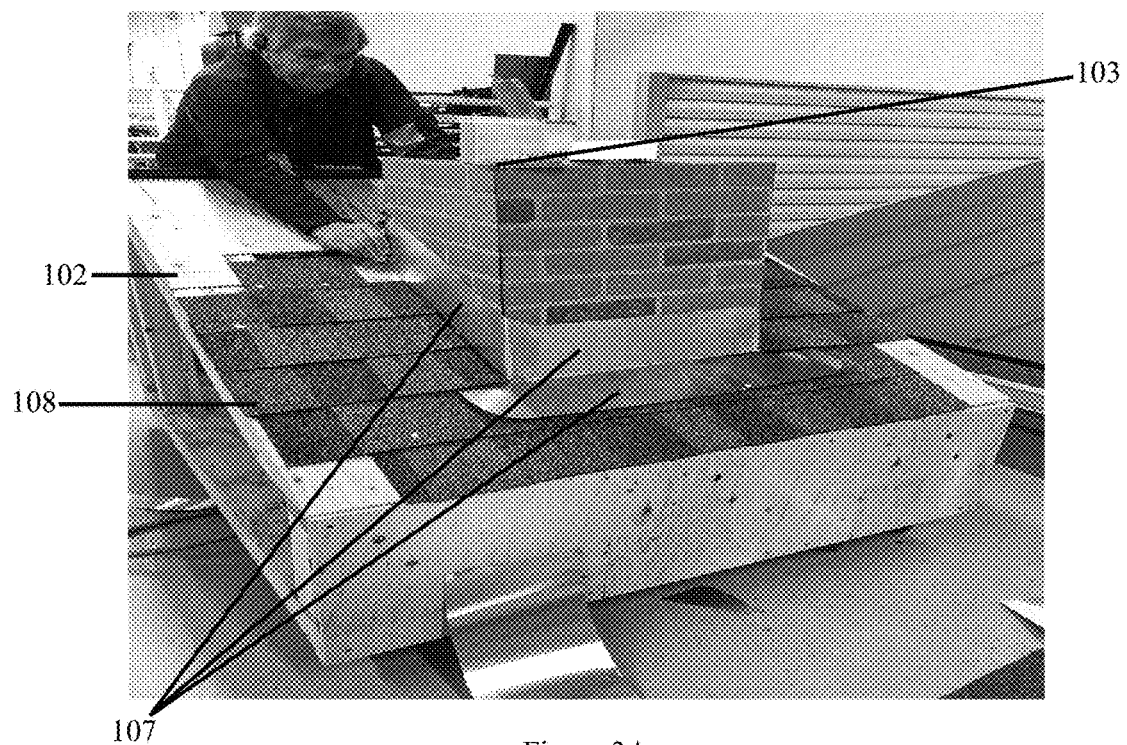
Figure 3B:
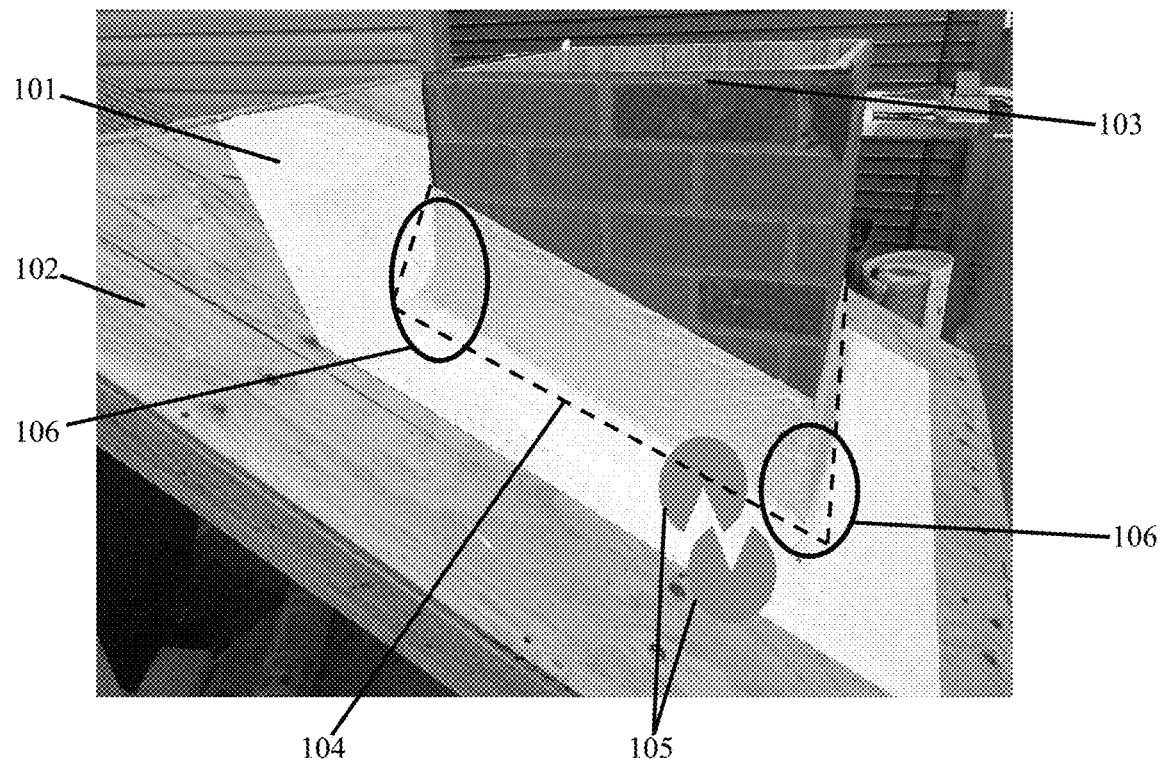

FIGS. 3A and 3B respectively depict comparative and exemplary roofing systems according to the present disclosure.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim.

As used herein, terms such as "consisting of" and "composed of" limit the scope of a specific claim to the materials and steps recited by the claim.

All prior patents, publications, and test methods referenced herein are incorporated by reference in their entireties.

As used herein, a "liquid applied roofing formulation" is any formulation that can be applied to at least one steep slope roof substrate in liquid form, such as but not limited to by spraying, coating, painting, or any combination thereof. A "liquid applied roofing formulation" includes, but is not limited to, any liquid applied roof coating described in US Patent Application Publication No. 2020/0224409, titled "Liquid Applied Roofing System with Improved Moisture Barrier Layer," which is incorporated herein by reference in its entirety for all purposes.

As defined herein, a "steep slope roof substrate" is any roof substrate that is disposed on a roof having a pitch of Y/X, where Y and X are in a ratio of 4:12 to 12:12, where Y corresponds to the "rise" of the roof, and where X corresponds to the "run" of the roof. In some embodiments, Y and X are in a ratio of 5:12 to 12:12. In some embodiments, Y and X are in a ratio of 6:12 to 12:12. In some embodiments, Y and X are in a ratio of 7:12 to 12:12. In some embodiments, Y and X are in a ratio of 6:12 to 12:12. In some embodiments, Y and X are in a ratio of 8:12 to 12:12. In some embodiments, Y and X are in a ratio of 6:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12. In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12. In some embodiments, Y and X are in a ratio of 5:12 to 11:12. In some embodiments, Y and X are in a ratio of 6:12 to 10:12. In some embodiments, Y and X are in a ratio of 7:12 to 9:12. In some embodiments, the at least one steep slope roof substrate comprises a plywood substrate, a glass substrate, a fiberglass substrate, (e.g., a fiberglass mat), a cellulosic substrate, an underlayment, a roof deck, a photovoltaic (PV) panel, a modified bitumen (MODBIT) substrate, a roll good, or any combination thereof.

As used herein, the term "resin" refers to any material that hardens upon curing. In some non-limiting examples, a resin may comprise at least one polymer material. In some non-limiting examples, a resin may harden upon exposure to moisture, air, heat, or any combination thereof. In some non-limiting examples, a resin may be a "two part" resin that hardens upon combination of first and second parts of the resin.

As used herein, the term "flashing" refers to a waterproofing material used in a building structure. In some non-limiting examples, flashings may be installed to prevent water damage from forming between interfaces of surfaces, including but not limited to, an interface between a roof substrate (e.g., a steep slope roof substrate) and a chimney. Non-limiting examples of flashings include chimney flashings, step flashings, drip flashings, valley flashings, and vent pipe flashings. Flashings may take forms including, but not limited to, metal flashings, plastic flashings, fabric flashings, polymer flashings, or any combination thereof.

As used herein, "a flashing area" is a portion of a building structure where at least one flashing is installed. In some embodiments, the portion of the building structure where at least one flashing is installed may be at least one portion of a steep slope roof substrate.

As used herein, the term "hybrid layered structure" refers to a structure that includes at least one coating layer (such, as but not limited to at least one coating layer applied to at least one steep slope roof substrate as a liquid applied roofing formulation) and at least one roofing membrane. In some embodiments, a "hybrid layered structure" may include a plurality of coating layers, a plurality of roofing membranes, or any combination thereof.

Some embodiments of the present disclosure relate to a method of installing a hybrid layered structure, as described herein, on at least one steep slope roof substrate.

In some embodiments, the method comprises obtaining a roofing membrane. In some embodiments, the roofing membrane is a single-ply roofing membrane. In some embodiments, the roofing membrane is a single-ply thermoplastic roofing membrane. In some embodiments, the roofing membrane comprises a thermoplastic polyolefin (TPO). In some embodiments, the roofing membrane comprises polyvinyl chloride (PVC). In some embodiments, the roofing membrane comprises ethylene propylene diene monomer (EPDM) rubber.

In some embodiments, the roofing membrane can be plasma treated. Non-limiting examples of exemplary plasma treatments are described in US Patent Application Publication No. 2020/0095768, titled "Roofing membranes with Improved Adhesive Bonding Strength," which is incorporated herein by reference in its entirety for all purposes. In some embodiments, the roofing membrane can be primed. In some embodiments, the roofing membrane is not treated (i.e., "fresh").

In some embodiments, the roofing membrane comprises an extrusion coating layer, a woven sheet, or any combination thereof. In some embodiments, the extrusion coating layer is laminated on the woven sheet.

In some embodiments, a combined thickness of the coating layer and the woven sheet is from 1 mil to 20 mil. In some embodiments, a combined thickness of the coating layer and the woven sheet is from 5 mil to 20 mil. In some embodiments, a combined thickness of the coating layer and the woven sheet is from 10 mil to 20 mil. In some embodiments, a combined thickness of the coating layer and the woven sheet is from 12 mil to 20 mil. In some embodiments, a combined thickness of the coating layer and the woven sheet is from 19 mil to 20 mil.

In some embodiments, a combined thickness of the coating layer and the woven sheet is from 1 mil to 19 mil. In some embodiments, a combined thickness of the coating layer and the woven sheet is from 1 mil to 12 mil. In some embodiments, a combined thickness of the coating layer and the woven sheet is from 1 mil to 10 mil. In some embodiments, a combined thickness of the coating layer and the woven sheet is from 1 mil to 5 mil.

In some embodiments, a combined thickness of the coating layer and the woven sheet is from 5 mil to 19 mil. In some embodiments, a combined thickness of the coating layer and the woven sheet is from 10 mil to 12 mil.

In some embodiments, the woven sheet has a thickness of 1 mil to 10 mil. In some embodiments, the woven sheet has a thickness of 2 mil to 10 mil. In some embodiments, the woven sheet has a thickness of 4 mil to 10 mil. In some embodiments, the woven sheet has a thickness of 6 mil to 10 mil. In some embodiments, the woven sheet has a thickness of 8 mil to 10 mil. In some embodiments, the woven sheet has a thickness of 9 mil to 10 mil.

In some embodiments, the woven sheet has a thickness of 1 mil to 9 mil. In some embodiments, the woven sheet has a thickness of 1 mil to 8 mil. In some embodiments, the woven sheet has a thickness of 1 mil to 6 mil. In some embodiments, the woven sheet has a thickness of 1 mil to 4 mil. In some embodiments, the woven sheet has a thickness of 1 mil to 2 mil.

In some embodiments, the woven sheet has a thickness of 2 mil to 9 mil. In some embodiments, the woven sheet has a thickness of 4 mil to 8 mil.

In some embodiments, the extrusion coating layer comprises at least one of: at least one polypropylene copolymer, at least one polyethylene copolymer, at least one UV stabilizer, at least one thermal stabilizer, at least one color concentrate, calcium carbonate, or any combination thereof.

In some embodiments, the extrusion coating layer comprises 50 to 200 parts of at least one polypropylene copolymer, at least one polyethylene copolymer, or any combination (e.g., a blend or copolymer) thereof. In some embodiments, the extrusion coating layer comprises 75 to 200 parts of at least one polypropylene copolymer, at least one polyethylene copolymer, or any combination (e.g., a blend or copolymer) thereof. In some embodiments, the extrusion coating layer comprises 100 to 200 parts of at least one polypropylene copolymer, at least one polyethylene copolymer, or any combination (e.g., a blend or copolymer) thereof. In some embodiments, the extrusion coating layer comprises 125 to 200 parts of at least one polypropylene copolymer, at least one polyethylene copolymer, or any combination (e.g., a blend or copolymer) thereof. In some embodiments, the extrusion coating layer comprises 150 to 200 parts of at least one polypropylene copolymer, at least one polyethylene copolymer, or any combination (e.g., a blend or copolymer) thereof. In some embodiments, the extrusion coating layer comprises 175 to 200 parts of at least one polypropylene copolymer, at least one polyethylene copolymer, or any combination (e.g., a blend or copolymer) thereof.

In some embodiments, the extrusion coating layer comprises 50 to 175 parts of at least one polypropylene copolymer, at least one polyethylene copolymer, or any combination (e.g., a blend or copolymer) thereof. In some embodiments, the extrusion coating layer comprises 50 to 150 parts of at least one polypropylene copolymer, at least one polyethylene copolymer, or any combination (e.g., a blend or copolymer) thereof. In some embodiments, the extrusion coating layer comprises 50 to 125 parts of at least one polypropylene copolymer, at least one polyethylene copolymer, or any combination (e.g., a blend or copolymer) thereof. In some embodiments, the extrusion coating layer comprises 50 to 100 parts of at least one polypropylene copolymer, at least one polyethylene copolymer, or any combination (e.g., a blend or copolymer) thereof. In some embodiments, the extrusion coating layer comprises 50 to 75 parts of at least one polypropylene copolymer, at least one polyethylene copolymer, or any combination (e.g., a blend or copolymer) thereof.

In some embodiments, the extrusion coating layer comprises 75 to 175 parts of at least one polypropylene copolymer, at least one polyethylene copolymer, or any combination (e.g., a blend or copolymer) thereof. In some embodiments, the extrusion coating layer comprises 100 to 150 parts of at least one polypropylene copolymer, at least one polyethylene copolymer, or any combination (e.g., a blend or copolymer) thereof.

In some embodiments, the extrusion coating layer comprises 1 to 5 parts of the at least one color concentrate. In some embodiments, the extrusion coating layer comprises 2 to 5 parts of the at least one color concentrate. In some embodiments, the extrusion coating layer comprises 3 to 5 parts of the at least one color concentrate. In some embodiments, the extrusion coating layer comprises 4 to 5 parts of the at least one color concentrate.

In some embodiments, the extrusion coating layer comprises 1 to 4 parts of the at least one color concentrate. In some embodiments, the extrusion coating layer comprises 1 to 3 parts of the at least one color concentrate. In some embodiments, the extrusion coating layer comprises 1 to 2 parts of the at least one color concentrate.

In some embodiments, the extrusion coating layer comprises 2 to 4 parts of the at least one color concentrate.

In some embodiments, the extrusion coating layer comprises 15 to 50 parts of calcium carbonate. In some embodiments, the extrusion coating layer comprises 20 to 50 parts of calcium carbonate. In some embodiments, the extrusion coating layer comprises 25 to 50 parts of calcium carbonate. In some embodiments, the extrusion coating layer comprises 30 to 50 parts of calcium carbonate. In some embodiments, the extrusion coating layer comprises 35 to 50 parts of calcium carbonate. In some embodiments, the extrusion coating layer comprises 40 to 50 parts of calcium carbonate. In some embodiments, the extrusion coating layer comprises 45 to 50 parts of calcium carbonate.

In some embodiments, the extrusion coating layer comprises 15 to 45 parts of calcium carbonate. In some embodiments, the extrusion coating layer comprises 15 to 40 parts of calcium carbonate. In some embodiments, the extrusion coating layer comprises 15 to 35 parts of calcium carbonate. In some embodiments, the extrusion coating layer comprises 15 to 35 parts of calcium carbonate. In some embodiments, the extrusion coating layer comprises 15 to 30 parts of calcium carbonate. In some embodiments, the extrusion coating layer comprises 15 to 25 parts of calcium carbonate. In some embodiments, the extrusion coating layer comprises 15 to 20 parts of calcium carbonate.

In some embodiments, the extrusion coating layer comprises 20 to 45 parts of calcium carbonate. In some embodiments, the extrusion coating layer comprises 25 to 40 parts of calcium carbonate. In some embodiments, the extrusion coating layer comprises 30 to 35 parts of calcium carbonate.

In some embodiments, the method comprises obtaining a liquid applied roofing formulation.

In some embodiments, the liquid applied roofing formulation comprises at least one resin.

In some embodiments, the at least one resin is chosen from polysiloxane, polyurea, polyurethane, silane modified ether, silane modified ester, silane modified polyurethane, silane modified polyurea, epoxy resin, acrylic resin, polyacrylic resin, any precursor thereof, or any combination thereof. In some embodiments, the at least one resin is selected from the group consisting of: polysiloxane, polyurea, polyurethane, silane modified ether, silane modified ester, silane modified polyurethane, silane modified polyurea, epoxy resin, acrylic resin, polyacrylic resin, any precursor thereof, and any combination thereof.

In some embodiments, the at least one resin is present in an amount ranging from 20% to 100% based on a total weight of the liquid applied roofing formulation. In some embodiments, the at least one resin is present in an amount ranging from 30% to 100% based on a total weight of the liquid applied roofing formulation. In some embodiments, the at least one resin is present in an amount ranging from 40% to 100% based on a total weight of the liquid applied roofing formulation. In some embodiments, the at least one resin is present in an amount ranging from 50% to 100% based on a total weight of the liquid applied roofing formulation. In some embodiments, the at least one resin is present in an amount ranging from 60% to 100% based on a total weight of the liquid applied roofing formulation. In some embodiments, the at least one resin is present in an amount ranging from 70% to 100% based on a total weight of the liquid applied roofing formulation. In some embodiments, the at least one resin is present in an amount ranging from 80% to 100% based on a total weight of the liquid applied roofing formulation. In some embodiments, the at least one resin is present in an amount ranging from 90% to 100% based on a total weight of the liquid applied roofing formulation.

In some embodiments, the at least one resin is present in an amount ranging from 20% to 90% based on a total weight of the liquid applied roofing formulation. In some embodiments, the at least one resin is present in an amount ranging from 20% to 80% based on a total weight of the liquid applied roofing formulation. In some embodiments, the at least one resin is present in an amount ranging from 20% to 70% based on a total weight of the liquid applied roofing formulation. In some embodiments, the at least one resin is present in an amount ranging from 20% to 60% based on a total weight of the liquid applied roofing formulation. In some embodiments, the at least one resin is present in an amount ranging from 20% to 50% based on a total weight of the liquid applied roofing formulation. In some embodiments, the at least one resin is present in an amount ranging from 20% to 40% based on a total weight of the liquid applied roofing formulation. In some embodiments, the at least one resin is present in an amount ranging from 20% to 30% based on a total weight of the liquid applied roofing formulation.

In some embodiments, the at least one resin is present in an amount ranging from 20% to 80% based on a total weight of the liquid applied roofing formulation. In some embodiments, the at least one resin is present in an amount ranging from 30% to 70% based on a total weight of the liquid applied roofing formulation. In some embodiments, the at least one resin is present in an amount ranging from 40% to 60% based on a total weight of the liquid applied roofing formulation.

In some embodiments, the liquid formulation comprises at least one liquid carrier. The type of the at least one liquid carrier is not limited and, in some embodiments may comprise water, an aqueous solution (e.g., an acidic solution, a basic solution, a salt solution, or any combination thereof), an organic liquid (e.g., an alcohol), or any combination thereof.

In some embodiments, the at least one liquid carrier is present in an amount ranging from 1% to 80% based on a total weight of the liquid applied roofing formulation. In some embodiments, the at least one liquid carrier is present in an amount ranging from 10% to 80% based on a total weight of the liquid applied roofing formulation. In some embodiments, the at least one liquid carrier is present in an amount ranging from 20% to 80% based on a total weight of the liquid applied roofing formulation. In some embodiments, the at least one liquid carrier is present in an amount ranging from 10% to 80% based on a total weight of the liquid applied roofing formulation. In some embodiments, the at least one liquid carrier is present in an amount ranging from 30% to 80% based on a total weight of the liquid applied roofing formulation. In some embodiments, the at least one liquid carrier is present in an amount ranging from 40% to 80% based on a total weight of the liquid applied roofing formulation. In some embodiments, the at least one liquid carrier is present in an amount ranging from 50% to 80% based on a total weight of the liquid applied roofing formulation. In some embodiments, the at least one liquid carrier is present in an amount ranging from 60% to 80% based on a total weight of the liquid applied roofing formulation. In some embodiments, the at least one liquid carrier is present in an amount ranging from 70% to 80% based on a total weight of the liquid applied roofing formulation.

In some embodiments, the at least one liquid carrier is present in an amount ranging from 1% to 70% based on a total weight of the liquid applied roofing formulation. In some embodiments, the at least one liquid carrier is present in an amount ranging from 1% to 60% based on a total weight of the liquid applied roofing formulation. In some embodiments, the at least one liquid carrier is present in an amount ranging from 1% to 50% based on a total weight of the liquid applied roofing formulation. In some embodiments, the at least one liquid carrier is present in an amount ranging from 1% to 40% based on a total weight of the liquid applied roofing formulation. In some embodiments, the at least one liquid carrier is present in an amount ranging from 1% to 30% based on a total weight of the liquid applied roofing formulation. In some embodiments, the at least one liquid carrier is present in an amount ranging from 1% to 20% based on a total weight of the liquid applied roofing formulation. In some embodiments, the at least one liquid carrier is present in an amount ranging from 1% to 10% based on a total weight of the liquid applied roofing formulation.

In some embodiments, the at least one liquid carrier is present in an amount ranging from 10% to 70% based on a total weight of the liquid applied roofing formulation. In some embodiments, the at least one liquid carrier is present in an amount ranging from 20% to 60% based on a total weight of the liquid applied roofing formulation. In some embodiments, the at least one liquid carrier is present in an amount ranging from 30% to 50% based on a total weight of the liquid applied roofing formulation.

In some embodiments, the liquid applied roofing formulation has a viscosity ranging from 100 cP to 10 million cP at 25° C. measured using a Brookfield viscometer at 20 rpm. In some embodiments, the liquid applied roofing formulation has a viscosity ranging from 1,000 cP to 10 million cP at 25° C. measured using a Brookfield viscometer at 20 rpm. In some embodiments, the liquid applied roofing formulation has a viscosity ranging from 10,000 cP to 10 million cP at 25° C. measured using a Brookfield viscometer at 20 rpm. In some embodiments, the liquid applied roofing formulation has a viscosity ranging from 100,000 cP to 10 million cP at 25° C. measured using a Brookfield viscometer at 20 rpm. In some embodiments, the liquid applied roofing formulation has a viscosity ranging from 1 million cP to 10 million cP at 25° C. measured using a Brookfield viscometer at 20 rpm.

In some embodiments, the liquid applied roofing formulation has a viscosity ranging from 100 cP to 1 million cP at 25° C. measured using a Brookfield viscometer at 20 rpm. In some embodiments, the liquid applied roofing formulation has a viscosity ranging from 100 cP to 100,000 cP at 25° C. measured using a Brookfield viscometer at 20 rpm. In some embodiments, the liquid applied roofing formulation has a viscosity ranging from 100 cP to 10,000 cP at 25° C. measured using a Brookfield viscometer at 20 rpm. In some embodiments, the liquid applied roofing formulation has a viscosity ranging from 100 cP to 1000 cP at 25° C. measured using a Brookfield viscometer at 20 rpm.

In some embodiments, the liquid applied roofing formulation has a viscosity ranging from 1000 cP to 1 million cP at 25° C. measured using a Brookfield viscometer at 20 rpm. In some embodiments, the liquid applied roofing formulation has a viscosity ranging from 10,000 cP to 100,000 cP at 25° C. measured using a Brookfield viscometer at 20 rpm.

In some embodiments, the method comprises applying the liquid applied roofing formulation to at least one steep slope roof substrate. In some embodiments, the method comprises applying the liquid applied roofing formulation to a plurality of steep slope roof substrates. In some embodiments, the at least one steep slope roof substrate comprises an underlayment. In some embodiments, the at least one steep slope roof substrate does not comprise an underlayment, such that the liquid applied roofing formulation may be applied directly to a roof deck. In some embodiments, the at least one steep slope roof substrate comprises metal flashing. In some embodiments, the at least one steep slope roof substrate does not comprise metal flashing.

In some embodiments, the at least one steep slope roof substrate does not comprise any flashing other than the hybrid layered structure, so as to result in an installation time that is 10% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 100% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 200% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 300% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 400% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 500% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 600% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 700% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 800% to 1000% shorter than a comparative installation time for a steep slope roof substrate that does comprise flashing. In some embodiments, the at least one steep slope roof substrate does not comprise any flashing other than the hybrid layered structure, so as to result in an installation time that is 900% to 1000% shorter than a comparative installation time for a steep slope roof substrate that does comprise flashing.

In some embodiments, the at least one steep slope roof substrate does not comprise any flashing other than the hybrid layered structure, so as to result in an installation time that is 10% to 900% shorter than a comparative installation time for a steep slope roof substrate that does comprise flashing. In some embodiments, the at least one steep slope roof substrate does not comprise any flashing other than the hybrid layered structure, so as to result in an installation time that is 10% to 900% shorter than a comparative installation time for a steep slope roof substrate that does comprise flashing. In some embodiments, the at least one steep slope roof substrate does not comprise any flashing other than the hybrid layered structure, so as to result in an installation time that is 10% to 800% shorter than a comparative installation time for a steep slope roof substrate that does comprise flashing. In some embodiments, the at least one steep slope roof substrate does not comprise any flashing other than the hybrid layered structure, so as to result in an installation time that is 10% to 700% shorter than a comparative installation time for a steep slope roof substrate that does comprise flashing. In some embodiments, the at least one steep slope roof substrate does not comprise any flashing other than the hybrid layered structure, so as to result in an installation time that is 10% to 600% shorter than a comparative installation time for a steep slope roof substrate that does comprise flashing. In some embodiments, the at least one steep slope roof substrate does not comprise any flashing other than the hybrid layered structure, so as to result in an installation time that is 10% to 500% shorter than a comparative installation time for a steep slope roof substrate that does comprise flashing. In some embodiments, the at least one steep slope roof substrate does not comprise any flashing other than the hybrid layered structure, so as to result in an installation time that is 10% to 400% shorter than a comparative installation time for a steep slope roof substrate that does comprise flashing. In some embodiments, the at least one steep slope roof substrate does not comprise any flashing other than the hybrid layered structure, so as to result in an installation time that is 10% to 300% shorter than a comparative installation time for a steep slope roof substrate that does comprise flashing. In some embodiments, the at least one steep slope roof substrate does not comprise any flashing other than the hybrid layered structure, so as to result in an installation time that is 10% to 200% shorter than a comparative installation time for a steep slope roof substrate that does comprise flashing. In some embodiments, the at least one steep slope roof substrate does not comprise any flashing other than the hybrid layered structure, so as to result in an installation time that is 10% to 100% shorter than a comparative installation time for a steep slope roof substrate that does comprise flashing.

In some embodiments, the at least one steep slope roof substrate does not comprise any flashing other than the hybrid layered structure, so as to result in an installation time that is 100% to 900% shorter than a comparative installation time for a steep slope roof substrate that does comprise flashing. In some embodiments, the at least one steep slope roof substrate does not comprise any flashing other than the hybrid layered structure, so as to result in an installation time that is 200% to 800% shorter than a comparative installation time for a steep slope roof substrate that does comprise flashing. In some embodiments, the at least one steep slope roof substrate does not comprise any flashing other than the hybrid layered structure, so as to result in an installation time that is 300% to 700% shorter than a comparative installation time for a steep slope roof substrate that does comprise flashing. In some embodiments, the at least one steep slope roof substrate does not comprise any flashing other than the hybrid layered structure, so as to result in an installation time that is 400% to 600% shorter than a comparative installation time for a steep slope roof substrate that does comprise flashing.

In some embodiments, installing the hybrid layered structure without any flashing other than the hybrid layered structure, does not result in a loss of waterproofing, relative to a steep slope roof substrate that does comprise flashing.

In some embodiments, the hybrid layered structure prevents water from getting underneath roofing shingles. In some embodiments, the hybrid layered structure prevents water from getting inside of the at least one protruding member.

In some embodiments, the at least one steep slope roof substrate comprises at least one protruding member. In some embodiments, the at least one protruding member protrudes from the at least one steep slope roof substrate. In some embodiments, the at least one protruding member protrudes directly from the at least one steep slope roof substrate. In some embodiments, the at least one protruding member protrudes indirectly from the at least one steep slope roof substrate. In some embodiments, the at least one protruding member is vertically oriented (i.e., points towards the sky). In some embodiments, the at least one protruding member is a chimney. In some embodiments, the at least one protruding member is a dormer. In some embodiments, the at least one protruding member is a skylight.

In some embodiments the at least one steep slope roof substrate comprises at least one flashing area. In some embodiments the at least one steep slope roof substrate comprises at least two flashing areas. In some embodiments, the at least one steep slope roof substrate comprises at least three flashing areas. In some embodiments, the at least one steep slope roof substrate comprises at least five flashing areas. In some embodiments, the at least one steep slope roof substrate comprises at least ten flashing areas. In some embodiments, the at least one steep slope roof substrate comprises at least twenty flashing areas. In some embodiments, the at least one steep slope roof substrate comprises at least fifty flashing areas. In some embodiments, the at least one steep slope roof substrate comprises at least one-hundred flashing areas.

In some embodiments, the at least one steep slope roof substrate comprises at least one first flashing area and at least one second flashing area. In some embodiments, the at least one steep slope roof substrate comprises at least one first flashing area, at least one second flashing area, and at least one third flashing area. In some embodiments, the at least one steep slope roof substrate comprises at least one first flashing area, at least one second flashing area, at least one third flashing area, and at least one fourth flashing area. In some embodiments, the at least one steep slope roof substrate comprises at least one first flashing area, at least one second flashing area, at least one third flashing area, at least one fourth flashing area, at least one fifth flashing area, and so on.

In some embodiments, the at least one first flashing area comprises an interface between the at least one steep slope roof substrate and the at least one protruding member. In some embodiments, the at least one first flashing area comprises a portion of the at least one at least one steep slope roof substrate. In some embodiments, the at least one first flashing area comprises a portion of the at least one protruding member.

In some embodiments, the at least one second flashing area comprises an interface between the at least one roofing membrane, as applied to the at least one at least one steep slope roof substrate, and the at least one protruding member. In some embodiments, the at least one second flashing area comprises a portion of the at least one roofing membrane. In some embodiments, the at least one second flashing area comprises a portion of the at least one protruding member.

In some embodiments the method comprises applying the liquid applied roofing formulation to the at least one steep slope roof substrate. In some embodiments the method comprises applying the liquid applied roofing formulation to the at least one at least one steep slope roof substrate. In some embodiments, the applying of the liquid applied roofing formulation to the at least one steep slope roof substrate comprises applying the liquid applied roofing formulation to the at least one first flashing area. In some embodiments, the liquid applied roofing formulation is solidified, so as to form a first coating layer. In some embodiments, solidifying the formulation comprises curing the formulation, drying the formulation, or any combination thereof.

In some embodiments, the method comprises covering the at least one steep slope roof substrate with the roofing membrane. In some embodiments, the covering of the at least one steep slope roof substrate with the roofing membrane comprises covering the at least first one flashing area with the roofing membrane over the first coating layer. In some embodiments, the covering of the at least one steep slope roof substrate with the roofing membrane comprises adhering the roofing membrane to the at least one steep slope roof substrate. In some embodiments, the roofing membrane is adhered to the at least one steep slope roof substrate using at least one adhesive. In some embodiments, the adhesive is disposed between the first coating layer and the roofing membrane. In some embodiments, the at least one adhesive is a spray adhesive. In some embodiments, the spray adhesive is a solvent-based rubber adhesive.

In some embodiments, the method comprises reapplying the liquid applied roofing formulation to the at least one steep slope roof substrate. In some embodiments, the reapplying of the liquid applied roofing formulation to the at least one steep slope roof substrate comprises applying the liquid applied roofing formulation to at least one second flashing area. In some embodiments, the liquid applied roofing formulation is applied over the roofing membrane. In some embodiments, the liquid applied roofing formulation is cured, so as to form a second coating layer on the at least one second flashing area. In some embodiments where the method comprises reapplying the liquid applied roofing formulation to the at least one steep slope roof substrate, the first and second coating layers may have the same composition.

In some embodiments, the method comprises applying a second liquid applied roofing formulation to the at least one steep slope roof substrate, where the second liquid applied roofing formulation is distinct from the liquid applied roofing formulation that is applied to form the first coating layer. In some embodiments, the second liquid applied roofing formulation may comprise any of the one or more resins described herein, any of the liquid carriers described herein, or any combination thereof. In some embodiments, the applying of the second liquid applied roofing formulation to the at least one steep slope roof substrate comprises applying the second liquid applied roofing formulation to the at least one second flashing area. In some embodiments, the second liquid applied roofing formulation is applied over the roofing membrane. In some embodiments, the applying of the second liquid applied roofing formulation to the at least one steep slope roof substrate comprises curing the second liquid applied roofing formulation, so as to form the second coating layer on the at least one flashing area. In embodiments where the method comprises applying the second liquid applied roofing formulation to the at least one steep slope roof substrate, the first and second coating layers have different compositions.

In some embodiments, the first coating layer, the roofing membrane, and the second coating layer define a hybrid layered structure. In some embodiments, any or all of the steps of the method can be repeated any number of times, such that the hybrid layered structure comprises at least two roofing membranes. In some embodiments, any or all of the steps of the method can be repeated any number of times, such that the hybrid layered structure comprises at least five roofing membranes. In some embodiments, any or all of the steps of the method can be repeated any number of times, such that the hybrid layered structure comprises at least ten roofing membranes. In some embodiments, any or all of the steps of the method can be repeated any number of times, such that the hybrid layered structure comprises at least twenty roofing membranes. In some embodiments, any or all of the steps of the method can be repeated any number of times, such that the hybrid layered structure comprises at least one-hundred roofing membranes. In some embodiments, any or all of the steps of the method can be repeated any number of times, such that the hybrid layered structure comprises at least three coating layers. In some embodiments, any or all of the steps of the method can be repeated any number of times, such that the hybrid layered structure comprises at least five coating layers. In some embodiments, any or all of the steps of the method can be repeated any number of times, such that the hybrid layered structure comprises at least ten coating layers. In some embodiments, any or all of the steps of the method can be repeated any number of times, such that the hybrid layered structure comprises at least twenty coating layers. In some embodiments, any or all of the steps of the method can be repeated any number of times, such that the hybrid layered structure comprises at least fifty coating layers. In some embodiments, any or all of the steps of the method can be repeated any number of times, such that the hybrid layered structure comprises at least one-hundred coating layers.

In some embodiments, the hybrid layered structure has a thickness of 5 mils to 500 mils. In some embodiments, the hybrid layered structure has a thickness of 10 mils to 500 mils. In some embodiments, the hybrid layered structure has a thickness of 50 mils to 500 mils. In some embodiments, the hybrid layered structure has a thickness of 100 mils to 500 mils. In some embodiments, the hybrid layered structure has a thickness of 200 mils to 500 mils. In some embodiments, the hybrid layered structure has a thickness of 300 mils to 500 mils. In some embodiments, the hybrid layered structure has a thickness of 400 mils to 500 mils.

In some embodiments, the hybrid layered structure has a thickness of 5 mils to 400 mils. In some embodiments, the hybrid layered structure has a thickness of 5 mils to 300 mils. In some embodiments, the hybrid layered structure has a thickness of 5 mils to 200 mils. In some embodiments, the hybrid layered structure has a thickness of 5 mils to 100 mils. In some embodiments, the hybrid layered structure has a thickness of 5 mils to 50 mils. In some embodiments, the hybrid layered structure has a thickness of 5 mils to 10 mils.

In some embodiments, the hybrid layered structure has a thickness of 10 mils to 400 mils. In some embodiments, the hybrid layered structure has a thickness of 50 mils to 300 mils. In some embodiments, the hybrid layered structure has a thickness of 100 mils to 200 mils.

Figure 1:
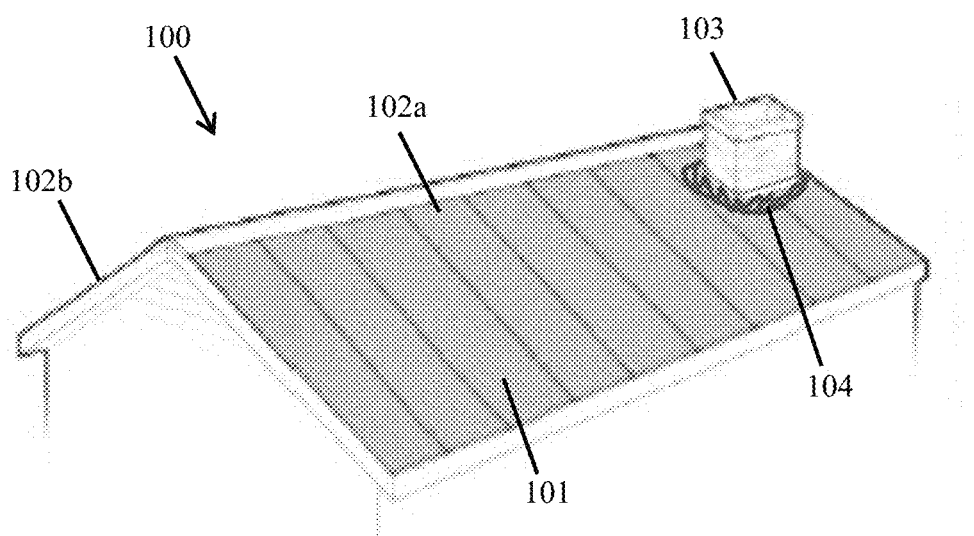
FIG. 1 depicts a non-limiting embodiment of a roofing system according to the present disclosure.

A non-limiting embodiment according to the present disclosure is shown in FIG. 1. As shown, a roof 100 may include at least one steep slope roof substrate 102a. In some embodiments, the roof may include a plurality of steep slope roof substrates 102a and 102b. The at least one steep slope roof substrate 102a may include a protruding member 103 and at least one first flashing area (not visible) as described herein. In some embodiments, roofing membrane 101 may be applied to the at least one steep slope roof substrate 102a over a first coating layer (not shown). In some embodiments, such as the exemplary embodiment of FIG. 1, a second coating layer may be applied over at least one second flashing area 104.

Some embodiments of the present disclosure relate to a roofing system.

In some embodiments, the roofing system comprises at least one steep slope roof substrate. In some embodiments, the at least one steep slope roof substrate is angled at any roof pitch or range of roof pitches described herein. In some embodiments, the roofing system comprises the at least one protruding member described herein, where the at least one protruding member protrudes from the at least one steep slope roof substrate.

In some embodiments, the at least one steep slope roof substrate comprises the at least one flashing area described herein. In some embodiments, the at least one steep slope roof substrate comprises the at least one first flashing area described herein. In some embodiments, the at least one steep slope roof substrate comprises the at least one second flashing area described herein.

In some embodiments, the roofing system comprises any hybrid layered structure described herein. In some embodiments, the hybrid layered structure comprises the first coating layer described herein, the roofing membrane described herein and the second coating layer described herein. In some embodiments, the first coating layer is disposed over the at least one first flashing area. In some embodiments, the first coating layer is disposed over the at least one second flashing area. In some embodiments, the hybrid layered structure may have any thickness described herein.

In some embodiments, the roofing membrane in the hybrid layered structure may comprise any roofing membrane described herein.

In some embodiments, the first coating layer comprises at least one first resin. The at least one first resin may be any resin or combination of resins described herein. In some embodiments, the at least one first resin may be present in any amount described herein.

In some embodiments, the second coating layer comprises at least one second resin. In some embodiments, the at least one second resin may be the same or different from the at least one first resin. The at least one second resin may be any resin or combination of resins described herein. In some embodiments, the at least one second resin present in any amount described herein.

In some embodiments, the roofing system does not comprise metal flashing. In some embodiments, the roofing system does not comprise an underlayment.

At least some non-limiting aspects of the present disclosure will now be described with reference to the following numbered embodiments (E1, E2, E3, E4 . . . ).

E1. A method comprising:
obtaining a roofing membrane;
obtaining a liquid applied roofing formulation,
applying the liquid applied roofing formulation to at least one flashing area of at least one steep slope roof substrate so as to form a first coating layer on the at least one flashing area,
wherein the at least one steep slope roof substrate comprises:
at least one protruding member,
wherein the at least one protruding member protrudes from the at least one steep slope roof substrate; and
the at least one flashing area,
wherein the at least one flashing area comprises an interface between the at least one steep slope roof substrate and the at least one protruding member;
covering the at least one steep slope roof substrate with a roofing roofing membrane, so as to form a hybrid layered structure on the steep slope roof substrate,
wherein the hybrid layered structure comprises:
the first coating layer; and
the roofing membrane.

E2. The method of E1, wherein the at least one flashing area of the at least one steep slope roof substrate comprises:
a first flashing area,
wherein the first flashing area comprises a first protruding member and a first interface between the roofing membrane and the first protruding member; and
a second flashing area,
wherein the second flashing area comprises a second protruding member and a second interface between the roofing membrane and the second protruding member; and
wherein the method further comprises:
applying the liquid applied roofing formulation to the second flashing area so as to form a second coating layer on the second flashing area; and
wherein the hybrid layered structure comprises:
the first coating layer;
the roofing membrane; and
the second coating layer.

E3: The method of E1 or E2, wherein the liquid applied roofing formulation comprises at least one resin.

E4: The method of E3, wherein the at least one resin is chosen from polysiloxane, polyurea, polyurethane, silane modified ether, silane modified ester, silane modified polyurethane, silane modified polyurea, epoxy resin, acrylic resin, polyacrylic resin, any precursor thereof, or any combination thereof.

E5: The method of E3 or E4, wherein the at least one resin is present in an amount ranging from 20% to 100% based on a total weight of the liquid applied roofing formulation.

E6: The method of any of E1 to E5, wherein the liquid applied roofing formulation has a viscosity ranging from 100 cP to 10 million cP at 25° C. measured using a Brookfield viscometer at 20 rpm.

E7: A roofing system comprising:
at least one steep slope roof substrate, wherein the at least one steep slope roof substrate comprises:
at least one protruding member,
wherein the at least one protruding member protrudes from the at least one steep slope roof substrate;
at least one flashing area, wherein the at least one flashing area comprises an interface between the at least one steep slope roof substrate and the at least one protruding member; and a hybrid layered structure, wherein the hybrid layered structure comprises:
  a first coating layer,
    wherein the first coating layer is disposed over the at least one flashing area; and
  a roofing membrane,
    wherein the roofing membrane is disposed over the first coating layer.

E8: The roofing system of E7, wherein the at least one flashing area of the at least one steep slope roof substrate comprises:
  a first flashing area,
    wherein the first flashing area comprises a first protruding member and a first interface between the roofing membrane and the first protruding member; and
  a second flashing area,
    wherein the second flashing area comprises a second protruding member and a second interface between the roofing membrane and the second protruding member; and
  wherein the roofing system further comprises a second coating layer, wherein the second coating layer is disposed over the at least one second flashing area, and wherein the hybrid layered structure comprises:
    the first coating layer;
    the roofing membrane; and
    the second coating layer.

EXAMPLES

Figure 2A:
FIGS. 2A-2C depict exemplary steep slope roof substrates in the form of plywood test decks. The plywood test decks were used to test certain non-limiting embodiments of the present disclosure.
Figure 2B:
Figure 2C:

Example 1: A time and motion study of at least one embodiment according to the present disclosure was conducted. In the study, exemplary roofing systems according to some embodiments of the present disclosure were installed using installation methods according to at some embodiments of the present disclosure. Specifically, two exemplary roofing systems and one comparative roofing system were installed on an outdoor 16'×24', 4"/12" steep slope roof substrate in the form of a plywood test deck. Comparative roofing system 1, roofing system 1, and roofing system 2 are shown in FIGS. 2A, 2B, and 2C respectively. Details of comparative roofing system 1, roofing system 1, and roofing system 2 are also tabulated in Table 1 below. As shown, the exemplary roofing systems according to the present disclosure have shorter installation times than the comparative roofing system.

TABLE 1

|  | Comparative Roofing System 1 | Roofing System 1 | Roofing System 2 |
| --- | --- | --- | --- |
| Description | Mechanically attached Asphalt Shingle | Mechanically attached thermoplastic roofing membrane including coating layers | Thermoplastic roofing membrane attached by spray adhesive including coating layers |
| Underlayment | Yes | No | No |
| Installation Time (hours) | 3.15 (includes underlayment installation time) | 1 | 1 |

Example 2: An additional time and motion study of at least one embodiment according to the present disclosure was conducted. In the present example, the time and motion study was conducted on a lab scale steep slope roof substrate. Specifically, comparative roofing system 1 and exemplary roofing system 1 from Example 1, above, were installed on the lab scale steep slope roof substrate shown in FIGS. 3A and 3B respectively. As shown, a protruding member 103 in the form of a chimney extended from the steep slope roof substrate 102.

Exemplary roofing system 1 was installed using the following steps: Steep slope roof substrate 102 was cleaned. Lines were drawn to define a boundary between the steep slope roof substrate 102 and the protruding member 103. Tape was applied to the boundary to define a first flashing area (not visible) encompassing a portion of the steep slope roof substrate 102 and a bottom portion of the protruding member 103. In this non-limiting example, the flashing area 104 was of 6" width surrounding the protruding member 103 and, as shown, extended upward onto the protruding member 103. The first flashing area was coated with the liquid applied roofing formulation described herein (which in this example was a solvent based synthetic rubber adhesive) to form a first coating layer. A roofing membrane 101 as described herein was laid out on the flashing area 104 over the first coating layer. "Pac-man" shaped fabrics 105 were attached to corners 106 of the protruding member 103. The liquid applied roofing formulation was re-applied to the second flashing area 104 over the roofing membrane 101 to form a second coating layer.

Comparative roofing system 1 was installed using the following steps: A continuous metal flashing in the form of strip (not shown) was installed on a portion of the steep slope roof substrate 102 surrounding the protruding member 103. Additional metal flashing 108 was installed on two vertical sides of the protruding member 103. Shingles 108 were installed over the continuous metal strip. Additional strips of metal flashing 107 were installed, so as to surround the sides of the protruding member 103. Waterproof caulk was used to seal top edges of the portions of the protruding member surrounded by the additional strips of metal flashing 107.

Results of the time and motion study are shown in Table 2 below.

TABLE 2

|  | Comparative Roofing System 1 | Roofing System 1 |
| --- | --- | --- |
| Description | Mechanically attached Asphalt Shingle with metal flashing | Thermoplastic roofing membrane with two coating layers. |
| Installation Time (hours) | 1 | 0.58 |

A more detailed breakdown of exemplary, non-limiting time durations associated with specific steps of the installation of roofing system 1 are tabulated below in Table 3 below.

TABLE 3

| Steps | Time (Min.) |
| --- | --- |
| Preparing steep slope roof substrate | 3.5 |
| Applying first coating layer on a portion of the first flashing area on the steep slope roof substrate | 5.5 |

TABLE 3-continued

| Steps | Time (Min.) |
| --- | --- |
| Applying first coating layer on a portion of the first flashing area on the protruding member | 3 |
| Laying out roofing membrane | 5.5 |
| Corner flashing with "Pac-man" shaped fabric | 8.5 |
| Applying second coating layer to the second flashing area | 8.5 |

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method comprising:
obtaining a roofing membrane;
obtaining a liquid applied roofing formulation;
applying the liquid applied roofing formulation to
(a) at least one flashing area;
(b) a portion of at least one protruding member; and
(c) a portion of at least one steep slope roof substrate
so as to form a first coating layer,
wherein the at least one protruding member protrudes from the at least one steep slope roof substrate; and
wherein the at least one flashing area comprises an interface between the at least one steep slope roof substrate and the at least one protruding member; and
covering the first coating layer with a roofing membrane, so as to form a hybrid layered structure,
wherein the hybrid layered structure comprises:
the first coating layer; and
the roofing membrane; and
wherein the at least one steep slope roof substrate does not include any flashing other than the hybrid layered structure.

2. The method of claim 1,
wherein the at least one flashing area comprises:
a first flashing area;
and
a second flashing are;
wherein the at least one protruding member comprises:
a first protruding member, and
a second protruding member; and
wherein the method further comprises applying the liquid applied roofing formulation to:
(a) the second flashing area
(b) the second protruding member; and
(c) the portion of at least one steep slope roof substrate
so as to form a second coating layer; and
wherein the hybrid layered structure comprises:
the first coating layer;
the roofing membrane; and
the second coating layer.

3. The method of claim 1, wherein the liquid applied roofing formulation comprises at least one resin.

4. The method of claim 3, wherein the at least one resin is chosen from polysiloxane, polyurea, polyurethane, silane modified ether, silane modified ester, silane modified polyurethane, silane modified polyurea, epoxy resin, acrylic resin, polyacrylic resin, any precursor thereof, or any combination thereof.

5. The method of claim 3, wherein the at least one resin is present in an amount ranging from 20% to 100% based on a total weight of the liquid applied roofing formulation.

6. The method of claim 1, wherein the liquid applied roofing formulation has a viscosity ranging from 100 cP to 10 million cP at 25° C. measured using a Brookfield viscometer at 20 rpm.

7. The method of claim 2, wherein the roofing membrane is disposed over the second coating layer.

8. A roofing system comprising:
at least one steep slope roof substrate,
at least one protruding member,
wherein the at least one protruding member protrudes from the at least one steep slope roof substrate;
at least one flashing area,
wherein the at least one flashing area comprises an interface between the at least one steep slope roof substrate and the at least one protruding member; and
a hybrid layered structure, wherein the hybrid layered structure comprises:
a first coating layer, wherein the first coating layer comprises
a liquid applied roofing formulation disposed over the at least one flashing area, a portion of the at least one protruding member, and a portion of the at least one steep slope roof substrate; and
a roofing membrane,
wherein the roofing membrane is disposed over the first coating layer wherein the at least one steep slope roof substrate does not include any flashing other than the hybrid layered structure.

9. The roofing system of claim 8,
wherein the at least one flashing area comprises:
a first flashing area;
and
a second flashing area;
and
wherein the at least one protruding member comprises:
a first protruding member, and
a second protruding member; and wherein the roofing system further comprises a second coating layer, wherein the second coating layer is disposed over the second flashing area, a portion of the second flashing area, and the portion of the at least one steep slope roof substrate, and wherein the hybrid layered structure comprises:
the first coating layer;
the roofing membrane; and
the second coating layer.

10. The roofing system of claim 8, wherein the roofing membrane is disposed over the second coating layer.

11. A method comprising:
obtaining a roofing membrane;
obtaining a liquid applied roofing formulation;
applying the liquid applied roofing formulation to
(a) at least one flashing area;
(b) a portion of at least one protruding member; and
(c) a portion of at least one steep slope roof substrate so as to form a first coating layer,
wherein the at least one protruding member protrudes from the at least one steep slope roof substrate; and
wherein the at least one flashing area comprises an interface between the at least one steep slope roof substrate and the at least one protruding member; and
covering the first coating layer with a roofing membrane, so as to form a coated roofing membrane;
applying a second coating layer to the coated roofing membrane so as to form a hybrid layered structure,
wherein the hybrid layered structure comprises:
the first coating layer;
the second coating layer; and
the roofing membrane.

* * * * *